US010033971B2

(12) United States Patent
Zhang et al.

(10) Patent No.: US 10,033,971 B2
(45) Date of Patent: Jul. 24, 2018

(54) DYNAMIC ACCESS METHOD OF MOBILE FRONT END, MOBILE FRONT END AND VIDEO SURVEILLANCE PLATFORM

(71) Applicant: ZTE Corporation, Shenzhen, Guangdong (CN)

(72) Inventors: Jie Zhang, Shenzhen (CN); Wei Zhang, Shenzhen (CN); Xing Yang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 204 days.

(21) Appl. No.: 14/901,644

(22) PCT Filed: Mar. 31, 2014

(86) PCT No.: PCT/CN2014/074473
§ 371 (c)(1),
(2) Date: Dec. 28, 2015

(87) PCT Pub. No.: WO2014/206216
PCT Pub. Date: Dec. 31, 2014

(65) Prior Publication Data
US 2016/0150194 A1    May 26, 2016

(30) Foreign Application Priority Data
Jun. 28, 2013  (CN) .......................... 2013 1 0268877

(51) Int. Cl.
*H04L 12/24* (2006.01)
*H04N 7/18* (2006.01)
(Continued)

(52) U.S. Cl.
CPC ............. *H04N 7/183* (2013.01); *H04L 63/10* (2013.01); *H04N 7/181* (2013.01); *H04N 7/185* (2013.01);
(Continued)

(58) Field of Classification Search
CPC . H04L 63/10; H04L 63/107; H04L 29/08657; H04L 67/18; H04L 9/0872;
(Continued)

(56) References Cited

U.S. PATENT DOCUMENTS

2003/0195808 A1* 10/2003 Brown ............... G06Q 30/0261
705/14.58
2003/0203730 A1* 10/2003 Wan ................. G08B 13/19621
455/404.2
(Continued)

FOREIGN PATENT DOCUMENTS

CN    101272481 A    9/2008
CN    101505414 A    8/2009
(Continued)

OTHER PUBLICATIONS

He, Tian, et al. "VigilNet: An integrated sensor network system for energy-efficient surveillance." ACM Transactions on Sensor Networks (TOSN) 2.1 (2006): 1-38.*
(Continued)

*Primary Examiner* — Michael Simitoski
(74) *Attorney, Agent, or Firm* — Oppedahl Patent Law Firm LLC (57) ABSTRACT

Disclosed are a dynamic access method of a mobile front end, a mobile front end and a video surveillance platform. The method includes that a mobile front end acquires location information of the mobile front end and sends the location information to each video surveillance platform of a Video Surveillance System (VSS); each video surveillance platform judges whether to allow all the mobile front ends to access according to a preconfigured administration scope and the location information sent from the mobile front end; and the mobile front end completes an access process with the video surveillance platform which allows it to access. When being powered on, the mobile front end can determine (Continued)

to access a video surveillance platform to which it belongs according to the geographic location where it is located; and when being moved to the area of other video surveillance platforms, the mobile front end can automatically negotiate to access a corresponding video surveillance platform.

16 Claims, 3 Drawing Sheets

(51) Int. Cl.
*H04N 21/4223* (2011.01)
*H04N 21/258* (2011.01)
*H04N 21/45* (2011.01)
*H04N 21/4627* (2011.01)
*H04L 29/06* (2006.01)
*H04L 9/32* (2006.01)

(52) U.S. Cl.
CPC . *H04N 21/25841* (2013.01); *H04N 21/25875* (2013.01); *H04N 21/4223* (2013.01); *H04N 21/4524* (2013.01); *H04N 21/4627* (2013.01)

(58) Field of Classification Search
CPC ....... H04N 21/25841; H04N 21/25875; H04N 21/4223; H04N 21/4524; H04N 21/4627; H04N 7/181; H04N 7/183; H04N 7/185; H04W 48/04; H04W 60/00; H04W 4/02; H04W 8/08; H04W 72/048; H04H 60/70
See application file for complete search history.

(56) References Cited

U.S. PATENT DOCUMENTS

| | | | |
|---|---|---|---|
| 2004/0028391 A1 | 2/2004 | Black | |
| 2004/0105005 A1* | 6/2004 | Yamamoto | G08B 13/19656 348/159 |
| 2004/0267551 A1* | 12/2004 | Yadav | G06Q 10/06375 455/456.1 |
| 2005/0170799 A1* | 8/2005 | Strandberg | H04H 40/18 455/186.1 |
| 2006/0072148 A1* | 4/2006 | Kovnat | G06F 3/122 358/1.15 |
| 2006/0227745 A1* | 10/2006 | Olvera-Hernandez | H04W 36/32 370/331 |
| 2006/0279628 A1* | 12/2006 | Fleming | G11B 27/034 348/143 |
| 2007/0039030 A1* | 2/2007 | Romanowich | G08B 13/19608 725/105 |
| 2008/0109885 A1* | 5/2008 | Sim | H04W 12/06 726/5 |
| 2008/0235185 A1* | 9/2008 | Fratti | H04W 48/14 |
| 2010/0112942 A9* | 5/2010 | Cannon | H04L 63/107 455/41.2 |
| 2010/0153770 A1* | 6/2010 | Lee | G08B 13/19656 714/4.1 |
| 2011/0016222 A1* | 1/2011 | Gu | H04L 12/66 709/231 |
| 2011/0183683 A1* | 7/2011 | Das | H04W 60/00 455/456.1 |
| 2012/0212668 A1* | 8/2012 | Schultz | H04N 5/23206 348/468 |
| 2012/0327245 A1* | 12/2012 | Rehn | H04N 5/772 348/159 |
| 2013/0117775 A1* | 5/2013 | Perry, II | H04L 65/4076 725/14 |
| 2013/0212204 A1* | 8/2013 | Kearney, III | H04W 4/021 709/208 |
| 2013/0229969 A1* | 9/2013 | Quan | H04L 12/189 370/312 |
| 2015/0326438 A1* | 11/2015 | Mowry | H04L 41/12 709/222 |

FOREIGN PATENT DOCUMENTS

| | | |
|---|---|---|
| CN | 102724224 A | 10/2012 |
| CN | 102809960 A | 12/2012 |
| CN | 102883144 A | 1/2013 |
| CN | 103079050 A | 5/2013 |
| EP | 2200000 A1 | 6/2010 |
| GB | 2389937 A | 12/2003 |
| WO | 2008127194 A1 | 10/2008 |

OTHER PUBLICATIONS

Iqbal, Razib, Saurabh Ratti, and Shervin Shirmohammadi. "A distributed camera network architecture supporting video adaptation." Distributed Smart Cameras, 2009. ICDSC 2009. Third ACM/IEEE International Conference on. IEEE, 2009.*
Lu, Jun, and Tatsuya Suda. "Differentiated surveillance for static and random mobile sensor networks." IEEE transactions on wireless communications 7.11 (2008).*
International Search Report in international application No. PCT/CN2014/074473, dated May 28, 2014.
English Translation of the Written Opinion of the International Search Authority in international application No. PCT/CN2014/074473, dated May 28, 2014.
Rita Cucchiara et al: "Mobile Video Surveillance Systems: An Architectural Overview", Mar. 25, 2010 (Mar. 25, 2010), Mobile Multimedia Processing, Springer Berlin Heidelberg, Berlin, Heidelberg, pp. 89-109, XP019139931,ISBN: 978-3-642-12348-1.
Supplementary European Search Report in European application No. 14817705.8, dated Jun. 6, 2016.

* cited by examiner

DYNAMIC ACCESS METHOD OF MOBILE FRONT END, MOBILE FRONT END AND VIDEO SURVEILLANCE PLATFORM

TECHNICAL FIELD

The present disclosure relates to the technical field of Video Surveillance System (VSS), and in particular to a dynamic access method of a mobile front end, a mobile front end and a video surveillance platform.

BACKGROUND

In a VSS with multiple platforms interconnected, when a mobile front end registers to access a video surveillance platform to which it belongs, it needs to use a Peripheral Unit Identifier (PUID) allocated by the platform in advance, specify the Internet Protocol (IP) address of the platform, and then access a corresponding platform. If the mobile front end needs to access another platform, it first needs to open an account on the portal of the corresponding platform, then logs out from the original platform, and finally uses the PUID and the IP address of a new platform to complete an access process.

In the VSS, the multiple platforms can communicate with each other, and platform information is shared. In such a system, how to enable the mobile front end to dynamically access any platform in the system, save a lot of time for configuring the mobile front end device on the platform, and make the deployment and use of the VSS more flexible and convenient becomes the technical problem to be solved in the field.

SUMMARY

For solving the existing technical problems, the present disclosure provides a dynamic access method of a mobile front end, a mobile front end and a video surveillance platform.

In the dynamic access method of a mobile front end in a VSS provided by an embodiment of the present disclosure, the mobile front end performs the following steps:

step A1: the mobile front end acquires location information of the mobile front end and sends the location information to each video surveillance platform of the VSS; and step A2: the mobile front end completes an access process with a video surveillance platform which allows the mobile front end to access.

In the method, the step A1 may include that: the mobile front end acquires the location information of the mobile front end through a Global Position System (GPS) in real time, and sends the location information to the each video surveillance platform of the VSS by multicast or broadcast.

In the method, the step A2 may include that:

the mobile front end receives, from the video surveillance platform, platform information and a temporary PUID allocated for the mobile front end by the video surveillance platform;

the mobile front end initiates a registration to a corresponding video surveillance platform based on a first received temporary PUID and platform information; and the corresponding video surveillance platform to which the registration is initiated is set as an access platform; when the registration is completed, the mobile front end saves platform information sent from the access platform and a PUID formally allocated for the mobile front end.

In the solution, in the dynamic access method of a mobile front end in a VSS, the each video surveillance platform may perform the following steps:

step B1: the video surveillance platform judges whether to allow the mobile front end to access according to a preconfigured administration scope and the location information sent from the mobile front end; and step B2: the video surveillance platform completes the access process with the from end which is allowed to access.

In the solution, the step B2 may include that:

the video surveillance platform allocates a temporary PUID for the mobile front end, and sends the temporary PUID along with platform information of the video surveillance platform to the mobile front end; and when the video surveillance platform becomes an object to which the mobile front end initiates a registration, the video surveillance platform completes the registration process, formally allocates a PUID for the mobile front end and sends the PUID along with the platform information to the mobile front end.

In the solution, the platform information may include a platform ID;

when the video surveillance platform becomes the object to which the mobile front end initiates the registration, the video surveillance platform first judges whether the mobile front end initiates the registration to the video surveillance platform according to the platform ID carried by the mobile front end during initiating the registration, and judges whether the registration is legal according to the temporary PUID carried by the mobile front end during initiating the registration; if it is determined that the mobile front end initiates the registration to the video surveillance platform and the registration is legal, then the registration is performed; the registration is not performed in other cases.

In the solution, after the mobile front end accesses successfully, the method may further include the following steps performed by the mobile front end:

step A3: the mobile front end periodically sends the location information and registration information to the each video surveillance platform of the VSS; and step A4: the mobile front end completes the access process with the video surveillance platform which informs the mobile front end to access, and exits an original video surveillance platform.

In the solution, after the mobile front end accesses successfully, the method may further include the following steps performed by the each video surveillance platform:

step B3: the video surveillance platform receives the location information and registration information from the mobile front end periodically;

step B4: the video surveillance platform judges whether the location information sent from the mobile front end is within an administration scope of the mobile from end; if within the administration scope, the video surveillance platform performs step B5; or else, the video surveillance platform continues to perform step B3;

step B5: the video surveillance platform judges whether the mobile front end has accessed this video surveillance platform according to the registration information; if the mobile front end has accessed this video surveillance platform according to the registration information, the video surveillance platform continues to perform step B3; or else, the video surveillance platform informs the mobile front end to access; and step B6: the video surveillance platform completes the access process with the mobile front end.

A mobile front end provided by the present disclosure includes:

an acquiring and sending module, which is configured to acquire location information of the mobile front end and send the location information to each video surveillance platform of the VSS; and a front end access module, which is configured to complete the access process with a video surveillance platform which allows the mobile front end to access.

The acquiring and sending module may be configured to acquire the location information of the mobile front end through a GPS in real time, and send the location information to the each video surveillance platform of the VSS by multicast or broadcast.

The front end access module may be configured to:

receive, from the video surveillance platform, platform information and a temporary PUID which is allocated for the mobile front end by the video surveillance platform;

initiate the registration to the corresponding video surveillance platform based on a first received temporary PUID and platform information; and set the corresponding video surveillance platform to which the registration is initiated as the access platform, and when the registration is completed, save platform information sent from the access platform and a PUID formally allocated for the mobile front end.

After the mobile front end accesses successfully, the acquiring and sending module may be further configured to periodically send the location information and the registration information to the each video surveillance platform of the VSS;

the front end access module is further configured to complete the access process with the video surveillance platform which informs the front end access module to access, and exit an original video surveillance platform.

A video surveillance platform provided by the present disclosure includes:

a judging module, which is configured to judge whether to allow a mobile front end to access according to the preconfigured administration scope and the location information sent from the mobile front end; and a platform access module, which is configured to complete the access process with the mobile front end which is allowed to access.

The platform access module may be specifically configured to:

allocate a temporary PUID for the mobile front end, and send the temporary PUID along with the platform information of the video surveillance platform to the mobile front end;

when the video surveillance platform becomes the object to which the mobile front end instates the registration, complete the registration, formally allocate a PUID for the mobile front end and send the PUID along with the platform information to the mobile front end.

The platform information may include a platform ID;

the platform access module may be configured to, when the video surveillance platform becomes the object to which the mobile front end initiates the registration, first judge whether the mobile front end initiates the registration to the video surveillance platform according to the platform ID carried by the mobile front end during initiating the registration, and judge whether the registration is legal according to the temporary PUID carried by the mobile front end during initiating the registration, and if it is determined that the mobile front end initiates the registration to the video surveillance platform and the registration is legal, then perform the registration, otherwise not perform the registration in other cases.

After the front end accesses successfully, the judging module may be further configured to receive the location information and the registration information from the mobile front end periodically, judge whether the location information sent from the mobile front end is within an administration scope of the mobile front end, and if within the administration scope, call the platform access module when it is determined that the mobile from end does not access the video surveillance platform according to the registration information, or else, continue to call the judging module; and the platform access module is further configured to inform the mobile front end to access and complete the access process.

The present disclosure also provides a computer-readable storage medium which includes a set of instructions, wherein the instructions are used for implementing the dynamic access method of a mobile front end in a VSS provided by an embodiment of the present disclosure.

By adopting the above technical solutions, the embodiments of the present disclosure at least have the following advantages:

according to the dynamic access method of a mobile front end, the mobile front end and the video surveillance platform in the embodiments of the present disclosure, when the mobile front end is powered on, the mobile front end can determine to access a video surveillance platform to which it belongs according to the geographic location where it is located; and when being moved to the area of other video surveillance platforms, the mobile front end can automatically negotiate to access a corresponding video surveillance platform. The technical solutions of the present disclosure can make the deployment of a multi-platform VSS simpler, and make the use thereof more convenient, thereby minimizing the complexity of configuring and maintaining the network, and enhancing the flexibility of using the network.

DETAILED DESCRIPTION

For further describing the technical means of the present disclosure adopted to achieve the desired purpose and effects, the present disclosure is described below in detail in combination with the accompanying drawings and preferred embodiments.

Figure 1:
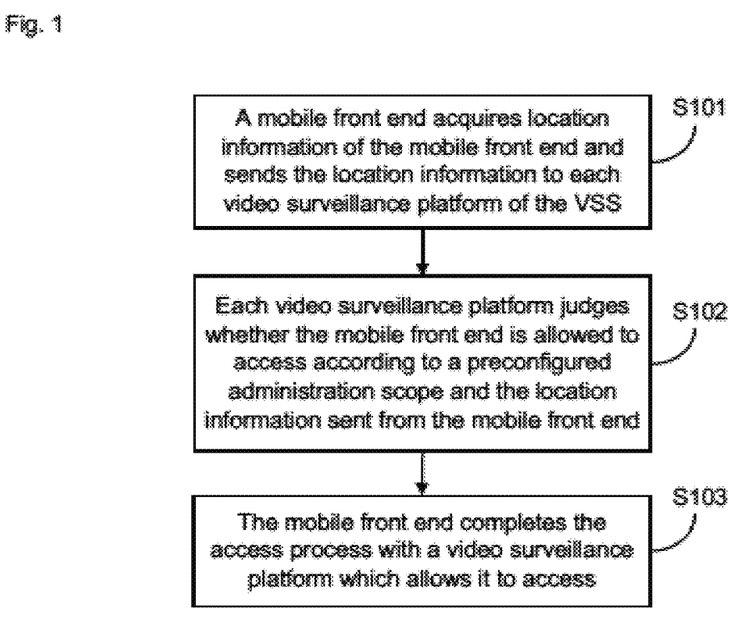
FIG. 1 is a flowchart of a dynamic access method of a mobile front end in a VSS according to the first embodiment of the present disclosure.

In the first embodiment of the present disclosure, a dynamic access method of a mobile front end in a VSS is provided; as shown in FIG. 1, the method includes the following specific steps.

Step 101: a mobile front end acquires location information of the mobile front end and sends the location information to each video surveillance platform of the VSS;

specifically, the mobile front end acquires the location information of the mobile front end through a GPS in real time, and sends the location information to the each video surveillance platform of the VSS by multicast and broadcast;

Step 102: each video surveillance platform judges whether to allow the mobile front end to access according to a preconfigured administration scope and the location information sent from the mobile front end;

specifically, each video surveillance platform judges whether the location information sent from the mobile front end is within an administration scope of the mobile front end; if so, the video surveillance platform allows the mobile front end to access; or else, the video surveillance platform does not allow the mobile front end to access; and step 103: the mobile front end completes the access process with the video surveillance platform which allows the mobile front to access.

Specifically, the step 103 includes the following processes:

A1: the video surveillance platform which allows the mobile front end to access allocates a temporary PUID for the mobile front end, and sends the temporary PUID along with platform information of the video surveillance platform to the mobile front end. The platform information includes a platform ID and a platform IP address;

A2: the mobile front end initiates the registration to the corresponding video surveillance platform based on the first received temporary PUID and platform information, and sets the video surveillance platform to which the registration is initiated as the access platform.

Specifically, the mobile front end finds the access platform based on the IP address of the platform and initiates the registration to the platform; at this point, the access platform first judges whether the mobile front end initiates the registration to it according to the platform ID, and judges whether the registration is legal according to the temporary PUID; if the temporary PUID sent from the mobile front end is consistent with the temporary PUID that the access platform sends the mobile front end before, then it means that the registration is legal; or else, the registration is illegal.

If it is determined that the mobile front end initiates the registration to this video surveillance platform and the registration is legal, then the registration is performed; the registration is not performed in other cases.

A3: when the registration is completed, the mobile front end saves the platform information sent from the access platform and the PUID formally allocated for the mobile front end.

Figure 2:
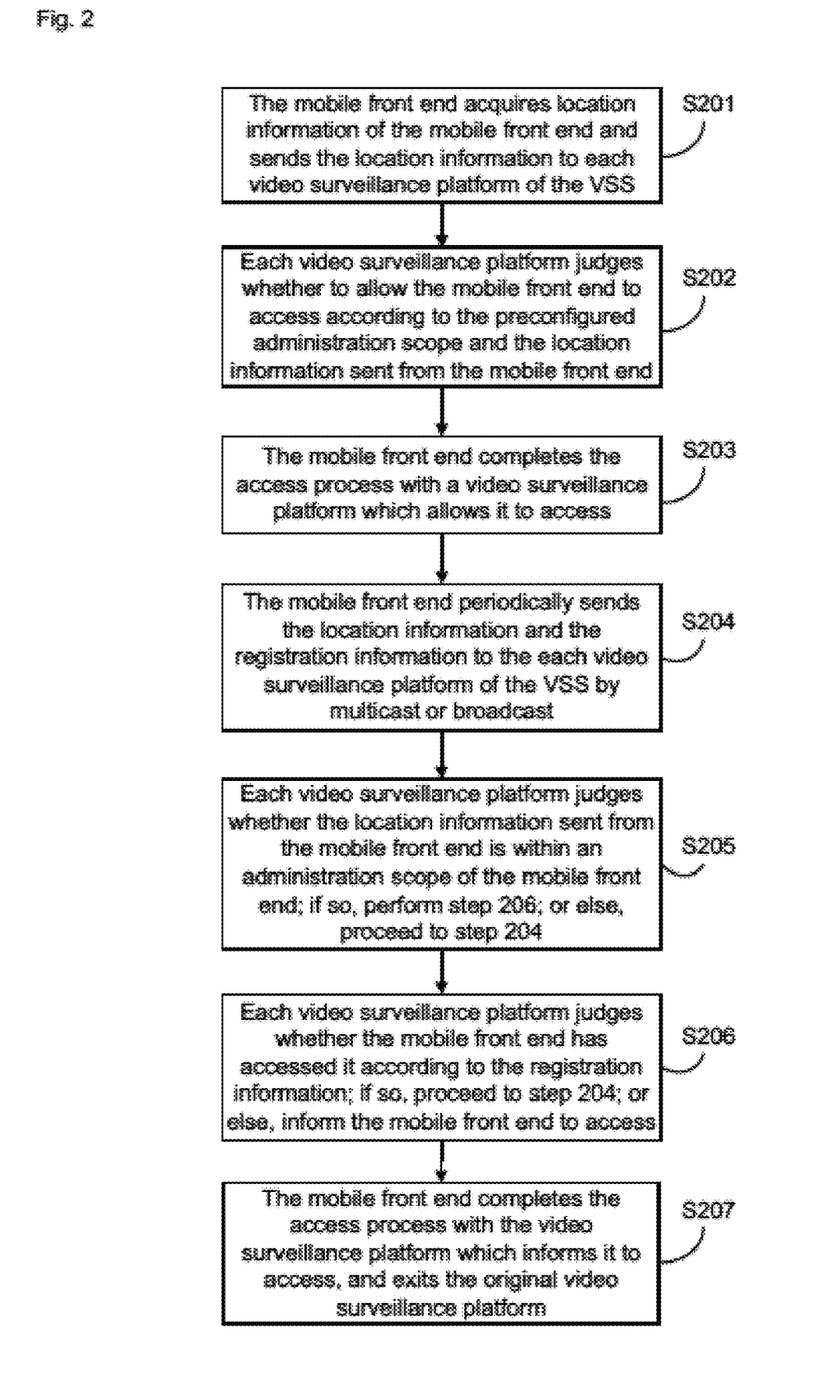
FIG. 2 is a flowchart of a dynamic access method of a mobile front end in a VSS according to the second embodiment of the present disclosure.

In the second embodiment of the present disclosure, a dynamic access method of a mobile front end in a VSS is provided; as shown in FIG. 2, the first access process in step 201 to step 203 of this embodiment is same as that in step 101 to step 103 of the first embodiment, and the difference is that after the mobile front end accesses successfully or accesses successfully each time, the method of this embodiment further includes the following specific steps:

step 204: the mobile front end periodically sends the location information and the registration information to the each video surveillance platform of the VSS by multicast or broadcast; wherein the registration information includes a formally allocated PUID and the platform ID of the current video surveillance platform which are saved by the mobile front end;

step 205: each video surveillance platform judges whether the location information sent from the mobile front end is within an administration scope of the mobile front end; if so, perform step 206; or else, proceed to step 204;

step 206: each video surveillance platform judges whether the mobile front end has accessed it according to the registration information; if so, proceed to step 294; or else, inform the mobile front end to access;

specifically, when both the platform ID and the formally allocated PUID are same as data saved locally, then it means that the mobile front end has accessed this video surveillance platform, and all the other cases mean that the mobile front end has not accessed this video surveillance platform; here, the data saved locally is the platform ID of this video surveillance platform and the PUID formally allocated by this video surveillance platform;

in step 206, the video surveillance platform informs the mobile front end to access in the following way: a temporary PUID is allocated for the mobile front end, and the temporary PUID along with the platform information of the video surveillance platform are sent to the mobile front end; the platform information includes the platform ID and the platform IP address; and step 207: the mobile front end completes the access process with the video surveillance platform which informs it to access, and exits the original video surveillance platform. Step 207 specifically includes the following steps:

step 71: there may be multiple surveillance platforms sending the temporary PUID and the platform information to the mobile front end during the same period of time, therefore, the mobile front end will judge whether the platform is the one that it accesses based on the first received temporary PUID and platform information; if so, proceed to step 204; or else, the mobile front end initiates a registration to the corresponding video surveillance platform and sets the platform to which me registration is initiated as a new access platform;

specifically, when finding the new access platform based on the platform IP address in the platform information and initiating the registration to it, the mobile front end includes the platform ID and the temporary PUID in the platform information;

step 72: the new access platform first judges whether the mobile front end initiates the registration to this video surveillance platform according to the platform ID, and judges whether the registration is legal according to the temporary PUID; if it is determined that the mobile front end initiates the registration to this video surveillance platform and the registration is legal, then the registration is performed, and the registration is not performed in other cases; and step 73: when the registration is completed, the mobile front end saves the platform information of the new access platform and the PUID formally allocated for it by the new access platform.

Figure 3:
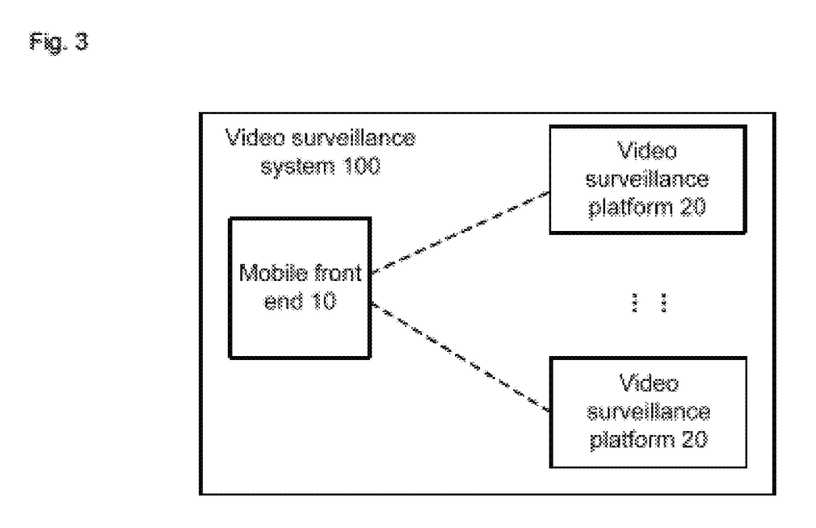
FIG. 3 is a composition diagram of the VSS according to the third embodiment and the fourth embodiment of the present disclosure.

In the third embodiment of the present disclosure, a VSS 100 is provided; as shown in FIG. 3, the VSS includes the following components:

a mobile front end 10, which is configured to acquire location information of the mobile front end and send the location information to each video surveillance platform of the VSS;

specifically, the mobile front end 10 is configured to acquire the location information of the mobile front end through a GPS in real time, and send the location information to the each video surveillance platform of the VSS by multicast or broadcast;

each video surveillance platform 20, which is configured to judge whether to allow the mobile front end 10 to access according to the preconfigured administration scope and the location information sent from the mobile front end 10, and complete the access process with the mobile front end 10 when the mobile front end 10 is allowed to access;

specifically, each video surveillance perform 20 is configured to judge whether the location information sent from the mobile front end 10 is within its own administration scope, if so, then allow toe mobile front end 10 to access, or else, not allow the mobile from end 10 to access;

platform 20 is further configured to when the mobile front end 10 is allowed to access, allocate a temporary PUID for the mobile front end 10, and send the temporary PUID along with the platform information of the video surveillance platform to the mobile front end 10;

at this point, the mobile front end 10 is further configured to: initiate the registration to the corresponding video surveillance platform based on the first received temporary PUID and platform information; and set the corresponding video surveillance platform to which the registration is initiated as an access platform, and when the registration is completed, save the platform information sent from the access platform and the PUID formally allocated for the mobile front end.

The platform information includes a platform ID and an platform IP address; the mobile front end 10 finds the access platform based on the platform IP address and initiates the registration to it; at this point the access platform is specifically configured to first judge whether the mobile front end 10 initiates the registration to this video surveillance platform according to the platform ID, and judge whether the registration is legal according to the temporary PUID; if it is determined that the mobile front end 10 initiates the registration to this video surveillance platform and the registration is legal, then the registration is performed, the registration is not performed in other cases.

In the fourth embodiment of the present disclosure, a VSS 100 is provided; as shown in FIG. 3, the function of completing the first access process of the system in this embodiment is same as that in the third embodiment; the difference is that after the mobile front end accesses successfully for the first time or accesses successfully each time, these components of the VSS 100 in this embodiment also have the following functions.

The mobile front end 10 is further configured to, after accessing successfully, periodically send the location information and registration information to each video surveillance platform 20 of the VSS by multicast or broadcast, wherein the registration information includes the formally allocated PUID and the platform ID of the current video surveillance platform which are saved, and exit the original video surveillance platform after completing the process of accessing the new video surveillance platform.

Each video surveillance platform 20 is further configured to judge whether the location information sent from the mobile front end 10 is within an administration scope of the mobile front end; if the location information is within an administration scope of the mobile front end, the video surveillance platform 20 is configured to judge whether the mobile front end 10 has accessed it according to the registration information, if so, then do nothing, or else, inform the mobile front end 10 to access to complete the access process; it the location information is not within an administration scope of the mobile from end, then the video surveillance platform 20 does nothing.

Specifically, the process about how to judge whether the mobile front end 10 has accessed this video surveillance platform according to the registration information is as follows: when both the platform ID and the formally allocated PUID are the same as the data saved locally, then it means that the mobile front end has accessed this video surveillance platform, and all the other cases mean that the mobile front end has not accessed this video surveillance platform; here, the data saved locally is the platform ID of this video surveillance platform and the PUID formally allocated by this surveillance platform.

In this embodiment, each video surveillance platform 20 informs the mobile front end 10 to access in the following way: a temporary PUID is allocated for the mobile front end 10, and the temporary PUID along with the platform information of the video surveillance platform are sent to the mobile front end 10; the platform information includes the platform ID and the platform IP address.

The mobile front end 10 is further configured to judge whether the video surveillance platform is the one that it accesses based on the first received temporary PUID and platform information, if so, do nothing, or else, initiate the registration to the corresponding video surveillance platform, and include the platform ID and the temporary PUID in the platform information; the mobile front end 10 is further configured to set the video surveillance platform to which the registration is initiated as a new access platform, and when the registration is completed, save the platform information of the new access platform and the PUID formally allocated for it by the new access platform.

The new access platform is further configured to first judge whether the mobile front end 10 initiates the registration to this video surveillance platform according to the platform ID, and judge whether the registration is legal according to the temporary PUID; if it is determined that the mobile front end 10 initiates the registration to this video surveillance platform and the registration is legal, then the registration is performed; the registration is not performed in other cases.

The mobile front end in the above embodiments includes:

an acquiring and sending module, which is configured to acquire location information of the mobile front end and send the location information to each video surveillance platform of the VSS; and a front end access module, which is configured to complete the access process with a video surveillance platform which allows the mobile front end to access.

The acquiring and sending module is configured to acquire the location information of the mobile front end through a GPS in real time, and send the location information to the each video surveillance platform of the VSS by multicast or broadcast.

The front end access module is configured to:

receive, from the video surveillance platform, the platform information and the temporary PUID allocated for the mobile front end by the video surveillance platform;

initiate the registration to a corresponding video surveillance platform based on the first received temporary PUID and platform information; and set the corresponding video surveillance platform to which the registration is initiated as an access platform, and when the registration is completed, save the platform information sent from the access platform and the PUID formally allocated for the mobile front end.

After the mobile front end accesses successfully, the acquiring and sending module is further configured to periodically send the location information and the registration information to the each video surveillance platform of the VSS;

the front end access module is further configured to complete the access process with the video surveillance platform which informs it to access, and exit the original video surveillance platform.

The video surveillance platform in the above embodiments includes:

a judging module, which is configured to judge whether to allow the mobile front end to access according to the preconfigured administration scope and the location information sent from the mobile front end; and the platform access module, which is configured to complete the access process with the mobile front end which is allowed to access.

The platform access module is specifically configured to:

allocate a temporary PUID for the mobile front end, and send the temporary PUID along with the platform information of the video surveillance platform to the mobile front end;

when becoming the object to which the mobile front end initiates the registration, complete the registration, formally allocate the PUID for the mobile front end and send the PUID along with the platform information to the mobile front end.

The platform information includes a platform ID;

the platform access module is configured to, when the video surveillance platform becomes the object to which the mobile front end initiates the registration, first judge whether the mobile front end initiates the registration to this video surveillance platform according to the platform ID carried by the mobile front end during initiating the registration, and judge whether the registration is legal according to the temporary PUID carried by the mobile front end during initiating the registration, and if it is determined that the mobile front end initiates the registration to this video surveillance platform and the registration is legal, then perform the registration, otherwise not perform the registration in other cases.

After the front end accesses successfully, the judging module is further configured to receive the location information and the registration information from the mobile front end periodically, judge whether the location information sent from the mobile front end is within an administration scope of the mobile front end, if so, call the platform access module when it is determined that the mobile front end does not access this video surveillance platform according to the registration information, or else, continue to call the judging module; and the platform access module is further configured to inform the mobile front to access and complete the access process.

The present disclosure also provides a computer-readable storage medium which includes a set of instructions, wherein the set of instructions are used for implementing the dynamic access method of a mobile front end in a VSS provided by an embodiment of the present disclosure.

An application example of the present disclosure is introduced below based on the above embodiments.

1. The process that the mobile front end registers and accesses for the first time when being powered on is as follows:

after being powered on, the mobile front end does not know which video surveillance platform in the VSS it needs to access, so it first needs to acquire geographical location information of the mobile front end through a GPS, and then transmits the Geographical location information m the whole network by multicast; a timer T1 is started to wait a response message of one or some video surveillance platforms in the system.

After receiving a multicast message from the mobile front end, the video surveillance platform judges whether the mobile from end is within an administration scope of the mobile front end in combination with its preconfigured administration scope according to the location information carried in the message; if the mobile front end is in the scope, then a temporary PUID is allocated, and the temporary PUID along with the platform ID and the platform IP address are sent to the mobile front end, a timer T2 is started to wait a registration message; if the mobile front end is not in the scope, the received multicast message is discarded. When the timer T2 expires, the video surveillance platform clears the allocated temporary PUID.

If the mobile front end receives a platform message before the timer T1 expires (if multiple platform messages are received, the first received platform message is taken, and the rest are discarded), the information (the temporarily allocated PUID, the platform IP address and the platform ID, etc.) carried in the platform message is used for initiating the registration to the platform, namely a registration request message is sent; the mobile front end starts a timer T3 to wait a registration completion response. If the platform message is not received when the timer T1 expires, then the mobile front end send the information to the VSS by multicast again, and waits the response of the video surveillance platform.

After receiving the registration request message, the video surveillance platform completes the registration process, and sends a registration completion message to the mobile front end, wherein the registration completion message includes the platform ID of the video surveillance platform, the formally allocated PUID, the IP address and other information; the mobile front end saves the platform ID of the video surveillance platform, the formally allocated PUID, the IP address and other information, and starts to work.

Until now, the process that the mobile front and registers and accesses when being powered on is ended. By using such an access method, the mobile front end can access the system very conveniently as long as it can acquire the location information without need of caring about the specific platform that it logs in, thereby getting rid of the tedious configuration process.

2. The process of dynamically switching the video surveillance platform after the mobile front end in the VSS has accessed successfully is as follows:

after accessing successfully, the mobile front end starts to periodically send the location information, and it is needed to carry the PUID thereof, the platform ID of the platform where the mobile front end is located currently, and the latest location information in this location report; after receiving the location information, the platform first judges whether the mobile front end is within an administration scope of the mobile front end; if the mobile front end is within an administration scope of the mobile front end, the platform judges whether the mobile front end has registered according to the platform ID and the PUID. If the mobile front end is in the administration scope and does not register to the platform, a temporary PUID is allocated for the mobile front end, and a platform message is replied to the mobile front end, wherein the platform message carries the platform ID, the temporarily allocated PUID and the platform IP address, and the registration request message is waited; if the mobile front end is not in the administration scope of the platform or the mobile front end has registered in the platform, then the location information of the mobile front end is discarded.

After receiving the platform message, the mobile front end first needs to judge whether the new platform which sends the platform message is same as the platform that it has accessed, if they are different, then the mobile front end stops sending the location information periodically, initiates the registration to the new platform and waits the registration completion message. If the new platform which sends the platform message is same as the platform that the mobile front end has accessed or the platform message is not received in the set time, then the mobile front end sends the location message again at the end of the set time.

The new platform performs the registration process when receiving a registration request; after receiving the registration completion message sent by the new platform, the mobile front end saves the IP of the new platform, the new allocated PUID and the IP address of the new platform, sends a logout message to the original platform, and exits the original platform.

Until now, the mobile front end has accessed the new platform from the original platform during moving, and starts to work normally. The whole process is automatically completed by the mobile front end and the platform through negotiation without needing the maintenance personnel to intervene, thereby greatly improving the convenience of deploying the surveillance system.

Note that, the access method of the mobile front end in the present disclosure is based on the VSS with multiple platforms interconnected; these platforms in the system can communicate with each other and share information. By using such a method to access the video surveillance platform, the mobile from end can minimize the complexity of deploying the VSS, and enhance the flexibility of network.

The platform in the VSS, the mobile front end and other concepts are well known by the skilled personnel in the field, so they will not be repeated here.

Those skilled in the art should appreciate that the embodiments in the present disclosure can be provided as method, system or computer program product. So, the present disclosure can adopt the form of hardware embodiment, software embodiment, or embodiment combining software with hardware. Besides, the preset disclosure can adopt the form of computer program product which is implemented on one or more computer available storage media (which include, but are not limited to, the disk storage and the optical memory, etc.) in which computer available program codes are included.

The present disclosure is described with reference to the flowcharts and/or block diagrams of the method, the device (system) and the computer program product according to the embodiments of the present disclosure. It should be understood that each flow and/or block in the flowchart and/or block diagram, and the combination of the flow and/or block in the flowchart and/or block diagram can be implemented by the computer program instructions. These computer program instructions can be provided to the processing unit of the general-purpose computer, the special-purpose computer, the embedded processor or other programmable data processing equipment to generate a machine, so that instructions which are executed by the processing unit of the computer or other programmable data processing equipment generate the device which is used for implementing the specified functions in one or more flows of the flowchart and/or one or more blocks of the block diagram.

These computer program instructions can also be stored in the computer-readable memory which can guide the computer or other programmable data processing equipment to work in a particular way, so that the instructions stored in the computer-readable memory generate the product including the instruction device, wherein the instruction device implements the specified functions in one or more flows of the flowchart and/or one or more blocks of the block diagram.

These computer program instructions can also be loaded on the computer or other programmable data processing equipment, so that a series of operation steps are executed on the computer or other programmable data processing equipment to generate the processing implemented by the computer, and the instructions executed on the computer or other programmable data processing equipment provide the steps for implementing the specified functions in one or more flows of the flowchart and/or one or more blocks of the block diagram.

By elaborating the specific embodiments, the technical means of the present disclosure adopted to achieve the purpose desired and effects should be able to be understood better and more specifically; however, the accompanying drawings are just for providing reference and elaborating, but not for limiting the present disclosure.

What is claimed is:

1. A dynamic access method of a mobile front end device in a Video Surveillance System (VSS), wherein the mobile front end device performs following steps:
   step A1: acquiring location information of the mobile front end device and sending the location information to each video surveillance platform of the VSS; and
   step A2: when a location indicated by the location information is within a preconfigured administration area of the VSS, completing an access process with a video surveillance platform which allows the mobile front end device to access, wherein the step A2 comprises:
   receiving, by the mobile front end device, platform information and a temporary Peripheral Unit Identifier (PUID) which is allocated by the video surveillance platform for the mobile front end device from the video surveillance platform;
   initiating, by the mobile front end device, a registration to a corresponding video surveillance platform based on a first received temporary PUID and platform information; and
   setting the corresponding video surveillance platform to which the registration is initiated as an access platform, and when the registration is completed, saving, by the mobile front end device, platform information sent from the access platform and a PUID formally allocated for the mobile front end device.

2. The dynamic access method of a mobile front end device in a VSS according to claim 1, wherein the step A1 comprises: acquiring, by the mobile front end device, the location information of the mobile front end device through a Global Position System (GPS) in real time, and sending the location information to the each video surveillance platform of the VSS by multicast or broadcast.

3. The dynamic access method of a mobile front end device in a VSS according to claim 1, after the mobile front end device accesses successfully, the method further comprising following steps performed by the mobile front end device:
   step A3: periodically sending the location information and registration information to the each video surveillance platform of the VSS; and
   step A4: completing the access process with the video surveillance platform which informs the mobile front end device to access, and exiting an original video surveillance platform.

4. A dynamic access method of a mobile front end device in a Video Surveillance System (VSS), wherein the each video surveillance platform performs following steps:

step B1: judging whether to allow a mobile front end device to access according to a preconfigured administration area and a location information sent from the mobile front end device; and step B2: when a location indicated by the location information is within the preconfigured administration area of the VSS, completing the access process with the mobile front end device which is allowed to access, wherein the step B2 comprises:

allocating, by the video surveillance platform, a temporary PUID for the mobile front end device, and sending the temporary PUID along with platform information of the video surveillance platform to the mobile front end device; and when the video surveillance platform becomes an object to which the mobile front end device initiates a registration, completing, by the video surveillance platform, the registration, formally allocating a PUID for the mobile front end device and sending the PUID along with the platform information to the mobile front end device.

5. The dynamic access method of a mobile front end device in a VSS according to claim 4, wherein the platform information comprises a platform identifier (ID);

when the video surveillance platform becomes the object to which the mobile front end device initiates the registration, first judging, by the video surveillance platform, whether the mobile front end device initiates the registration to the video surveillance platform according to the platform ID carried by the mobile front end device during initiating the registration, and judging whether the registration is legal according to the temporary PUID carried by the mobile front end device during initiating the registration; if it is determined that the mobile front end device initiates the registration to the video surveillance platform and the registration is legal, then performing the registration, otherwise not performing the registration in other cases.

6. The dynamic access method of a mobile front end device in a VSS according to claim 4, after the mobile front end device accesses successfully, the method further comprising following steps performed by the each video surveillance platform:

step B3: receiving the location information and registration information from the mobile front end device periodically;

step B4: judging whether the location indicated by the location information sent from the mobile front end device is within the preconfigured administration area of the VSS; if within the preconfigured administration area of the VSS, performing step B5; or else, continuing to perform step B3;

step B5: judging whether the mobile front end device has accessed this video surveillance platform according to the registration information; if the mobile front end device has accessed this video surveillance platform according to the registration information, continuing to performing step B3; or else, informing the mobile front end device to access; and step B6: completing the access process with the mobile front end device.

7. The dynamic access method of a mobile front end device in a VSS according to claim 4, after the mobile front end device accesses successfully, the method further comprising following steps performed by the each video surveillance platform:

step B3: receiving the location information and registration information from the mobile front end device periodically;

step B4: judging whether the location indicated by the location information sent from the mobile front end device is within a preconfigured administration area of the VSS; if within the preconfigured administration area of the VSS, performing step B5; or else, continuing to perform step B3;

step B5: judging whether the location indicated by the mobile front end device has accessed this video surveillance platform according to the registration information; if the mobile front end device has accessed this video surveillance platform according to the registration information, continuing to performing step B3; or else, informing the mobile front end device to access; and step B6: completing the access process with the mobile front end device.

8. The dynamic access method of a mobile front end device in a VSS according to claim 4, after the mobile front end device accesses successfully, the method further comprising following steps performed by the each video surveillance platform:

step B3: receiving the location information and registration information from the mobile front end device periodically;

step B4: judging whether the location indicated by the location information sent from the mobile front end device is within a preconfigured administration area of the VSS; if within the administration area, performing step B5; or else, continuing to perform step B3;

step B5: judging whether the mobile front end device has accessed this video surveillance platform according to the registration information; if the mobile front end device has accessed this video surveillance platform according to the registration information, continuing to performing step B3; or else, informing the mobile front end device to access; and step B6: completing the access process with the mobile front end device.

9. The dynamic access method of a mobile front end device in a VSS according to claim 4, after the mobile front end device accesses successfully, the method further comprising following steps performed by the each video surveillance platform:

step B3: receiving the location information and registration information from the mobile front end device periodically;

step B4: judging whether the location indicated by the location information sent from the mobile front end device is within a preconfigured administration area of the VSS; if within the preconfigured administration area of the VSS, performing step B5; or else, continuing to perform step B3;

step B5: judging whether the location indicated by the mobile front end device has accessed this video surveillance platform according to the registration information; if the mobile front end device has accessed this video surveillance platform according to the registration information, continuing to performing step B3; or else, informing the mobile front end device to access; and step B6: completing the access process with the mobile front end device.

10. A mobile front end device, comprising a memory and a processor, and wherein the processor is arranged to execute steps by performing instructions stored in the memory, and the steps executed by the processor comprise:
  acquiring location information of the mobile front end device;
  sending the location information to each video surveillance platform of a Video Surveillance System (VSS); and
  when a location indicated by the location information is within a preconfigured administration area of the VSS, completing an access process with a video surveillance platform which allows the mobile front end device to access, and wherein the steps executed by the processor comprise:
  receiving, from the video surveillance platform, platform information and a temporary Peripheral Unit Identifier (PUID) which is allocated for the mobile front end device by the video surveillance platform;
  initiating a registration to a corresponding video surveillance platform based on a first received temporary PUID and platform information; and
  setting the corresponding video surveillance platform to which the registration is initiated as an access platform, and
  when the registration is completed, saving platform information sent from the access platform and a PUID formally allocated for the mobile front end device.

11. The mobile front end device according to claim 10, wherein the steps executed by the processor comprise:
  acquiring the location information of the mobile front end device through a Global Position System (GPS) in real time, and
  sending the location information to the each video surveillance platform of the VSS by multicast or broadcast.

12. The mobile front end device according to claim 10, wherein after the mobile front end device accesses successfully, the steps executed by the processor further comprise:
  sending the location information and registration information to the each video surveillance platform of the VSS;
  completing the access process with the video surveillance platform which informs the front end access module to access, and exit an original video surveillance platform.

13. A video surveillance platform, comprising a memory and a processor, and wherein the processor is arranged to execute steps by performing instructions stored in the memory, and the steps executed by the processor comprise:
  judging whether to allow a mobile front end device to access according to a preconfigured administration area and location information sent from the mobile front end device; and
  when the location indicated by the location information is within the preconfigured administration area of the VSS, completing an access process with the mobile front end device which is allowed to access, and wherein the steps executed by the processor comprise:
  allocating a temporary Peripheral Unit Identifier (PUID) for the mobile front end device;
  sending the temporary PUID along with platform information of the video surveillance platform to the mobile front end device;
  when the video surveillance platform becomes an object to which the mobile front end device initiates a registration, completing the registration, formally allocate a PUID for the mobile front end device, and
  sending the PUID along with the platform information to the mobile front end device.

14. The video surveillance platform according to claim 13, wherein the platform information comprises a platform identifier (ID), and the steps executed by the processor comprise
  when the video surveillance platform becomes the object to which the mobile front end device initiates the registration, first judging whether the mobile front end device initiates the registration to the video surveillance platform according to the platform ID carried by the mobile front end device during initiating the registration;
  judging whether the registration is legal according to the temporary PUID carried by the mobile front end device during initiating the registration, and
  if it is determined that the mobile front end device initiates the registration to the video surveillance platform and the registration is legal, then performing the registration, otherwise not perform the registration in other cases.

15. The video surveillance platform according to claim 13, wherein after the mobile front end device accesses successfully, the steps executed by the processor comprise:
  receiving the location information and registration information from the mobile front end device periodically;
  judging whether the location indicated by the location information sent from the mobile front end device is within the preconfigured administration area of the VSS;
  if within the administration area, determining that the mobile front end device does not access the video surveillance platform according to the registration information, or else, continue to the judging step;
  informing the mobile front end device to access and complete the access process.

16. A non-transitory computer-readable storage medium, comprising a set of instructions for implementing a dynamic access method of a mobile front end device in a Video Surveillance System (VSS) and wherein the method comprises:
  step A1: acquiring location information of the mobile front end device and sending the location information to each video surveillance platform of the VSS; and
  step A2: when a location indicated by the location information is within a preconfigured administration area of the VSS, completing an access process with a video surveillance platform which allows the mobile front end device to access; and wherein the step A2 comprises:
  receiving, by the mobile front end device, platform information and a temporary Peripheral Unit Identifier (PUID) which is allocated by the video surveillance platform for the mobile front end device from the video surveillance platform;
  initiating, by the mobile front end device, a registration to a corresponding video surveillance platform based on a first received temporary PUID and platform information; and
  setting the corresponding video surveillance platform to which the registration is initiated as an access platform, and when the registration is completed, saving, by the mobile front end device, platform information sent from the access platform and a PUID formally allocated for the mobile front end device.

* * * * *